(12) United States Patent  (10) Patent No.: US 8,560,008 B2
Islam et al.  (45) Date of Patent: Oct. 15, 2013

(54) METHOD AND APPARATUS FOR NETWORK SCANNING BASED ON NEIGHBOR INFORMATION

(71) Applicant: Research in Motion Limited, Waterloo (CA)

(72) Inventors: Muhammad Khaledul Islam, Kanata, CA (US); Jeffrey William Wirtanen, Kanata, CA (US)

(73) Assignee: Blackberry Limited, Waterloo, Ontario (CA)

( * ) Notice: Subject to any disclaimer, the term of this patent is extended or adjusted under 35 U.S.C. 154(b) by 0 days.

(21) Appl. No.: 13/658,445

(22) Filed: Oct. 23, 2012

(65) Prior Publication Data

US 2013/0045747 A1  Feb. 21, 2013

Related U.S. Application Data

(63) Continuation of application No. 12/362,616, filed on Jan. 30, 2009, now Pat. No. 8,311,576.

(51) Int. Cl.
 *H04M 1/00* (2006.01)
(52) U.S. Cl.
 USPC ........................... 455/552.1; 455/434
(58) Field of Classification Search
 USPC ............................... 455/434, 552.1
 See application file for complete search history.

(56) References Cited

U.S. PATENT DOCUMENTS

| | | | |
|---|---|---|---|
| 5,163,161 A | 11/1992 | Bowles et al. | |
| 5,551,071 A | 8/1996 | Nakano et al. | |
| 5,754,956 A | 5/1998 | Abreu et al. | |
| 5,822,686 A | 10/1998 | Lundberg et al. | |
| 5,937,351 A | 8/1999 | Seekins et al. | |
| 6,148,203 A | 11/2000 | Renko et al. | |
| 6,226,527 B1 | 5/2001 | Dalsgaard et al. | |
| 6,765,891 B2 | 7/2004 | Laitinen et al. | |
| 6,778,827 B1 | 8/2004 | Anderson et al. | |
| 6,810,251 B2 | 10/2004 | Hassan et al. | |
| 6,889,049 B2 | 5/2005 | Khawand | |
| 7,299,042 B2 | 11/2007 | Moore et al. | |
| 8,023,896 B2 * | 9/2011 | Hildebrand et al. | 455/62 |
| 8,249,591 B2 | 8/2012 | Tod et al. | |

(Continued)

FOREIGN PATENT DOCUMENTS

| | | |
|---|---|---|
| CN | 1989713 A | 6/2007 |
| EP | 1739990 | 1/2007 |

(Continued)

OTHER PUBLICATIONS

Notice of Allowance dated Apr. 6, 2012 from related U.S. Appl. No. 12/356,710.

(Continued)

*Primary Examiner* — Tuan H Nguyen

(57) ABSTRACT

A wireless device receives neighbor information broadcasted by a current serving network. The neighbor information includes frequency information of neighbors and overlay RAT (radio access technology). According to an embodiment of the disclosure, the wireless device avoids various frequency blocks when scanning for a RAT when it is known from the neighbor information that those frequency blocks are used for a different RAT. Those frequency blocks can either be skipped altogether or scanned only after other frequency blocks are scanned. Therefore, the amount of network scanning can be reduced.

20 Claims, 7 Drawing Sheets

(56) References Cited

U.S. PATENT DOCUMENTS

| | | |
|---|---|---|
| 2001/0005359 A1 | 6/2001 | Bergqvist |
| 2002/0105927 A1 | 8/2002 | Holma et al. |
| 2004/0082328 A1 | 4/2004 | Japenga et al. |
| 2004/0125783 A1 | 7/2004 | Hsueh et al. |
| 2004/0157608 A1 | 8/2004 | Kurose et al. |
| 2004/0248572 A1 | 12/2004 | Ormson |
| 2005/0202828 A1 | 9/2005 | Pecen et al. |
| 2005/0266845 A1 | 12/2005 | Aerrabotu et al. |
| 2005/0282544 A1 | 12/2005 | Oommen et al. |
| 2006/0009216 A1 | 1/2006 | Welnick et al. |
| 2006/0084443 A1 | 4/2006 | Yeo et al. |
| 2006/0154699 A1 | 7/2006 | Ko et al. |
| 2007/0004408 A1 | 1/2007 | Buckley et al. |
| 2007/0207815 A1 | 9/2007 | Alfano et al. |
| 2007/0230420 A1 | 10/2007 | Bumiller et al. |
| 2008/0014957 A1 | 1/2008 | Ore |
| 2008/0153486 A1* | 6/2008 | Ramkull et al. ............ 455/434 |
| 2008/0176564 A1 | 7/2008 | Eerolainen |
| 2009/0047958 A1 | 2/2009 | Rimhagen et al. |
| 2010/0222055 A1 | 9/2010 | Cho et al. |

FOREIGN PATENT DOCUMENTS

| | | |
|---|---|---|
| EP | 1744573 | 1/2007 |
| EP | 1788832 | 5/2007 |
| EP | 1830596 | 9/2007 |
| EP | 1858278 | 11/2007 |
| EP | 1921882 | 5/2008 |
| EP | 1921885 | 5/2008 |
| WO | 92/19982 | 11/1992 |
| WO | 00/16581 | 3/2000 |
| WO | 01/33481 | 5/2001 |
| WO | 01/62034 | 8/2001 |
| WO | 01/76274 | 10/2001 |
| WO | 02/21875 | 3/2002 |
| WO | 2004/010719 | 1/2004 |
| WO | 2005/011134 | 2/2005 |
| WO | 2005/120123 | 12/2005 |
| WO | 2006/014092 | 2/2006 |
| WO | 2007/076232 | 7/2007 |
| WO | 2008/154218 | 12/2008 |

OTHER PUBLICATIONS

Office Action dated Jul. 29, 2011 from related U.S. Appl. No 12/356,710.
Examination Report dated Jun. 8, 2010 from corresponding European Patent Application No. 09151727.6.
Ericsson "On Inter-RAT Cell Reselection Principles" http://www.3gpp.org/ftp/tsg_ran/WG2_RL2/TSGR2_57/Documents/, retrieved on Apr. 23, 2008.
European Search Report dated Jun. 29, 2009 from related European Patent Application No. 09151050.3.
European Search Report dated Jul. 23, 2009 from corresponding European Patent Application No. 09151727.6.
3GPP; "3rd Generation Partnership Project; Technical Specification Group GSM/EDGE Radio Access Network; Radio subsystem link control (Release 8)"; GSM Global System for Mobile Communications; 3GPP TS 45.008 V8.0.0 (Aug. 2008); Total pages: 126.
European Search Report dated Jan. 5, 2009 from related European Application No. EP08160765.
3GPP; "3rd Generation Partnership Project; Technical Specification Group Radio Access Network; Requirements for support of radio resource management (FDD) (Release 5)"; 3GPP TS 25.133 V5.18.0 (Sep. 2007); Total pp. 82.
3GPP; "3rd Generation Partnership Project; Technical Specification Group GSM/EDGE Radio Access Network; Mobile radio interface layer 3 specification; Radio Resource Control (RRC) protocol (Release 5)"; GSM Global System for Mobile Communications; 3GPP TS 44.018 V5.22.0 (May 2006); Total pp. 320.
Office Action dated Feb. 15, 2013 from related U.S. Appl. No. 13/542,180.
English-language translation of an Office Action dated Jul. 4, 2012 from related Chinese Patent Application No. 201010135567.1.

* cited by examiner

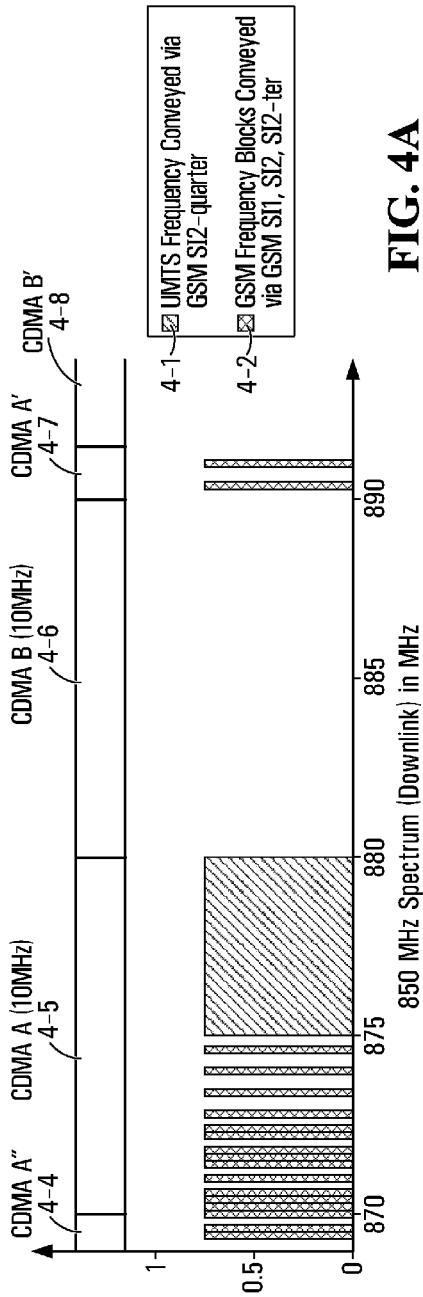
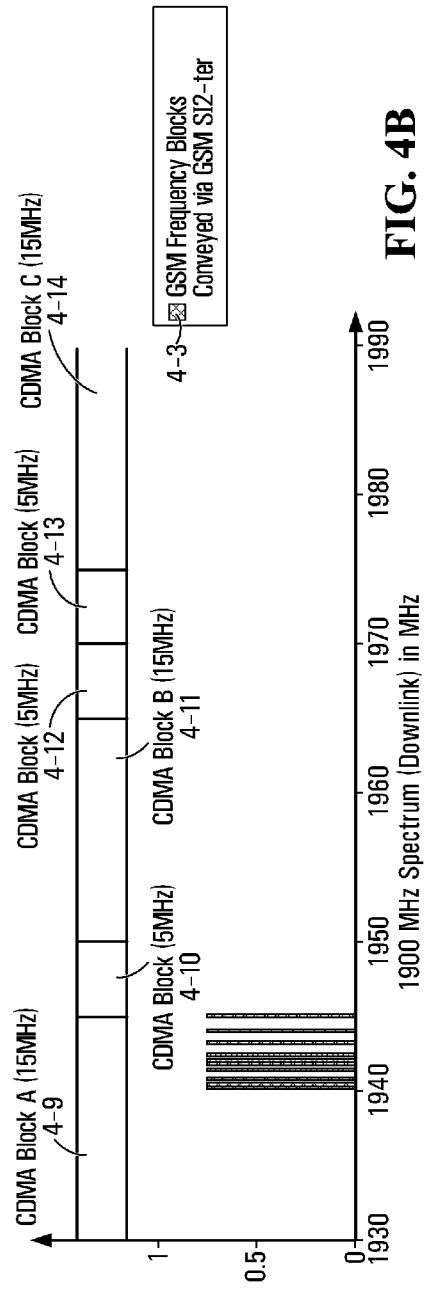
FIG. 4A
FIG. 4B

METHOD AND APPARATUS FOR NETWORK SCANNING BASED ON NEIGHBOR INFORMATION

RELATED APPLICATION

This application is a continuation application of U.S. patent application Ser. No. 12/362,616 filed Jan. 30, 2009, the entire contents of which are incorporated by reference.

FIELD OF THE DISCLOSURE

This disclosure relates to wireless communication, and more particularly to wireless devices supporting multiple RATs (radio access technologies).

BACKGROUND

A multimode wireless device supports multiple RATs (radio access technologies) and typically operates on multiple frequency bands. As a first example, a wireless device might support GSM/GPRS/EDGE (Global System for Mobile communications/General Packet Radio Service/Enhanced Data rates for GSM Evolution), UMTS/HSPA (Universal Mobile Telecommunications System/High-Speed Packet Access), and CDMA2000 1x/1xEV-DO (Code Division Multiple Access 2000 1x/1x Evolution-Data Optimized or 1x Evolution-Data only). As a second example, a wireless device might support GSM/GPRS/EDGE, and UMTS/HSPA. Other wireless devices might support a different set of RATs.

Most regulated licensed frequency bands are typically allocated to be used by multiple air interfaces (or equivalently multiple RATs) as shown in the following table.

| Frequency Band (downlink frequency) | Air Interfaces (RATs) | | |
|---|---|---|---|
| | GSM/GPRS/EDGE | UMTS/HSPA | cdma2000 1x/ 1xEV-DO |
| 869-894 MHz | known cellular 850 MHz band | known as band V | known as band class 0 or NA cellular band |
| 1930-1990 MHz | known as PCS 1900 MHz band | known as band II | known as band class 1 or PCS band |
| 925-960 MHz | known as E-GSM | known as band VIII, currently being deployed | known as band class 9 (not deployed yet) |
| 2100-2170 MHz | No | known as band I | known as band class 6 (not deployed yet) |
| 1805-1880 MHz | known as GSM 1800 | known as band III (not deployed yet) | known as band class 8 (not deployed yet) |

For example, a 60-MHz-wide PCS band and 25-MHz-wide cellular band can be split into multiple blocks and allocated to a first provider (GSM/GPRS/EDGE+UMTS/HSPA operator), a second provider (cdma2000 1x/1xEV-DO operator), and a third provider (GSM operator).

A wireless device acquires a network of a given RAT by using a transceiver that is specific to the RAT in order to receive service. As indicated in the table above, each RAT typically operates on multiple frequency bands. Therefore, there are numerous possibilities in terms of supported frequency bands and supported RATs. A wireless device might scan all of the supported frequency bands and all of the supported RATs in order to search for a network. With the introduction of more frequency bands and RATs, the amount of network scanning that a multi-mode device performs can become excessive. Excessive network scanning is undesirable because it takes time, consumes battery power, occupies communication resources, introduces latency to provide service, etc.

BRIEF DESCRIPTION OF THE DRAWINGS

Embodiments will now be described with reference to the attached drawings in which:

FIGS. 4A and 4B are graphs featuring an example of deployment or usage of UMTS and GSM frequencies in cellular and PCS bands as conveyed via a GSM network in cellular band as its neighbour cells;

DETAILED DESCRIPTION OF EMBODIMENTS

Figure 1:
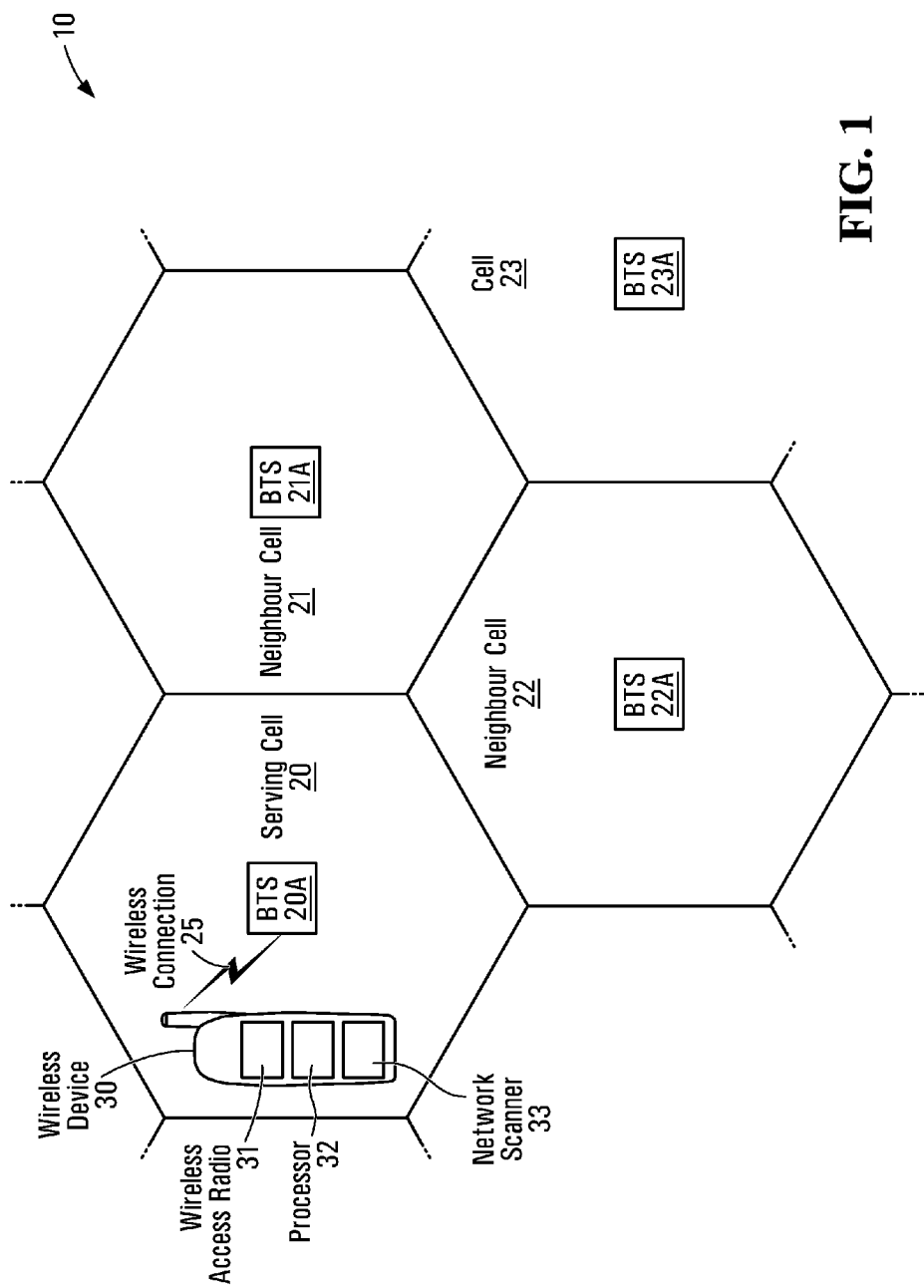
FIG. 1 is a block diagram of an example communication system featuring a cellular network and a wireless device.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to a broad aspect, there is provided a method for execution by a wireless device supporting a plurality of RATs (radio access technologies), the method comprising: while in a current cell: (a) receiving, from the current cell, first neighbour information, indicating frequency and RAT of at least one neighboring cell; and (b) receiving, from a neighbour cell that neighbours the current cell, second neighbour information indicating frequency and RAT of at least one neighboring cell of the neighbour cell; determining at least one frequency used for a first RAT based on the first and second neighbour information; and scanning for a network using the first RAT or a second RAT based on the at least one frequency used for the first RAT.

According to another broad aspect, there is provided a computer readable medium having computer executable instructions stored thereon for execution on a processor of a wireless device so as to implement a method comprising: while in a current cell: (a) receiving, from the current cell, first neighbour information, indicating frequency and RAT of at least one neighboring cell; and (b) receiving, from a neighbour cell that neighbours the current cell, second neighbour information indicating frequency and RAT of at least one neighboring cell of the neighbour cell; determining at least one frequency used for a first RAT based on the first and second neighbour information; and scanning for a network using the first RAT or a second RAT based on the at least one frequency used for the first RAT.

According to another broad aspect, there is provided a wireless device supporting a plurality of RATs (radio access technologies), the wireless device comprising: while in a current cell: (a) receiving, from the current cell, first neighbour information, indicating frequency and RAT of at least one neighboring cell; and (b) receiving, from a neighbour cell that neighbours the current cell, second neighbour information indicating frequency and RAT of at least one neighboring cell of the neighbour cell; determining at least one frequency used for a first RAT based on the first and second neighbour information; and scanning for a network using the first RAT or a second RAT based on the at least one frequency used for the first RAT.

Other aspects and features of the present disclosure will become apparent, to those ordinarily skilled in the art, upon review of the following description of the specific embodiments of the disclosure.

Communication System

Referring now to FIG. 1, shown is a block diagram of an example communication system featuring a first network 10 and a wireless device 30. The first network 10 has a plurality of cells 20, 21, 22, 23 each having a respective BTS (base transceiver station) 20A, 21A, 22A, 23A. All of the BTSs 20A, 21A, 22A, 23A are configured to use a first RAT, for example GSM. To support a second RAT, for example UMTS, the communication system has a second network (not shown) having BTSs that are configured to use the second RAT. The BTSs of the second network are generally not coterminous with the BTSs 20A, 21A, 22A of the first network 10, but they can be in alternative configurations. There may be an additional network (not shown) for each additional RAT supported by the communication system. In alternative configurations, the BTSs 20A, 21A, 22A of the cellular network 10 support more than one RAT, for example both GSM and UMTS, in which case there might not be a second or additional core network, but there are still two radio access networks for the two RATs. Other configurations are possible. The cellular network 10 includes more cells than that shown and might have other network components, but they are not shown for sake of simplicity. Some of these network components might be shared with other networks (not shown) that might overlap with the cellular network 10.

The plurality of cells 20, 21, 22, 23 include a serving cell 20 and neighbor cells 21, 22. A cell is determined to neighbor another cell based on various factors relating to coverage in vicinity. Neighboring cells are typically in the same vicinity and might have significant overlapping area when they are from separate networks. In some cases, neighbor cells of a different RAT may completely overlap the serving cell in an overlay manner. In other words, although not depicted in this manner, the neighbor cells 21, 22 might completely overlap the geographical area covered by the serving cell 20. The plurality of cells 20, 21, 22, 23 also include another cell 23 that neighbors the neighbor cells 21, 22. Thus, relative to the serving cell 20, the cell 23 is a neighbor's neighbor.

The wireless device 30 has a wireless access radio 31, a processor 32, and a network scanner 33. The wireless device 30 might have other components, but they are not shown for sake of simplicity. The wireless device 30 is configured to support a plurality of RATs (radio access technologies) including the first RAT of the first network 10 and the second RAT of the second network (not shown). The wireless device 30 might support additional RATs. In some configurations, the wireless access radio 31 includes a respective radio for each supported RAT. In alternative configurations, the wireless access radio 31 is a single radio supporting the plurality of RATs. Other configurations are possible. The wireless device 30 is one of a plurality of wireless devices (not shown) of the communication system. The other wireless devices might be configured in a similar manner as the wireless device 30, or configured differently.

The operation of the communication system will now be described by way of example. The wireless device 30 scans for a network, as the wireless device 30 is to acquire a network in order to receive service. Alternatively, if the wireless device 30 has stored identifiers of a last used network such as frequency and other RAT-specific identifiers (such as primary scrambling code in case of UMTS, short pseudo-random code in case of CDMA etc.) before the wireless device 30 was turned off, then the wireless device 30 might simply tune directly to that frequency and attempt to acquire the last camped network on that frequency upon the wireless device 30 being turned on. In any event, it is assumed that wireless device 30 acquires the network 10 using the first RAT, for example GSM. The wireless device 30 is also assumed to have service in the serving cell 20 and can therefore communicate with the BTS 20A over a wireless connection 25 using the first RAT. The communication might for example include a voice call or other forms of communication such as packet data communication (e.g. email communication).

While in the serving cell 20, the wireless device 30 receives neighbor information broadcasted from the BTS 20A. The neighbor information indicates frequencies used for the first RAT by the neighboring cells 21, 22. The neighbor information might explicitly indicate that the first RAT is used by the neighboring cells 21, 22, or implicitly indicate this by not referring to any RAT in which case it can be assumed that the RAT used by the neighboring cells 21, 22 is the same as the first RAT used by the serving cell 30. In some implementations, the neighbor information of a given RAT additionally indicates frequency and RAT for neighboring cells that are on different RATs.

While in the serving cell 20, the wireless device 30 might also receive neighbor information broadcasted from one or more of the BTSs 21, 22 of the neighbor cells 21, 22. This can provide additional information for the wireless device 30 than just the neighbor information broadcasted by the BTS 20A of the serving cell 20. For instance, neighbor information broadcasted from the BTS 21A of the neighbor cell 21 can indicate frequencies used for the first RAT by the cell 23 and other neighboring cells. The neighbor information broadcasted from the BTS 21A of the neighbor cell 21 can also indicate frequency and RAT for neighboring cells that are on different RATs.

Although the wireless device 30 is assumed to have service in the serving cell 20, it is noted that the wireless device 30 can receive at least partial neighbor information irrespective of whether the wireless device 30 has been granted any service in the serving cell 20. This is because at least partial neighbor information is provided over a broadcast channel. Therefore, the wireless device 30 can receive the neighbor information while in any one of a plurality of possible states. The wireless device 30 can receive the neighbor information for example while in an idle state, an in-call state, or a camped state without any service. Other states might be possible. The wireless device 30 can typically obtain more information about frequency usage during the in-call state. Although examples might assume that the wireless device has service in which case the wireless device resides in a "serving cell", more generally, embodiments of the disclosure are applicable to the wireless device residing in a "current cell" that may or may not offer any service. For example, the current cell may only provide "limited" service such as allowing only emergency calls.

The wireless device 30 might subsequently scan for another network, even if it has been granted service in the serving cell 20. There are many possible reasons why the wireless device 30 might subsequently scan for another network. Scanning for another network might be performed automatically, or initiated manually by a user. For example, scanning for another network might be performed automatically by the device in order to obtain a higher priority (more preferred) network which may be using a different RAT. A higher priority network might for example be a network that provides service under an advantageous billing agreement. Scanning for another network might also be performed automatically by the device in order to obtain better service. For instance, if the wireless device presently has only circuit switched service with a present network, then the wireless device might scan for another network that offers both circuit switched service and packet switched service. Also, if the wireless device presently has no service except for making emergency calls, then the wireless device might scan for another network that offers service beyond making emergency calls. Examples of user-initiated scans include performing a manual search to find all available systems (e.g. manual scan to find all available GSM/UMTS systems), or user changing the mode on the device to operate in CDMA-only mode or GSM/GPRS/EDGE-only mode or UMTS/HSPA-only mode.

According to an embodiment of the disclosure, if the wireless device 30 is to scan for another network, then the wireless device 30 performs the scanning based on the neighbor information from the serving cell and/or neighbor information from one or more neighbor cells 21, 22. Examples of how this is performed are detailed below.

A first example will now be described for a scenario in which the wireless device 30 scans for another network that uses a second RAT, for example CDMA, which is different from the first RAT used by the serving cell 20. The network scanner 33 determines frequencies used for the first RAT based on the neighbor information. In some implementations, the network scanner 33 also determines frequencies used for other known RATs if the neighbor information indicates this information. For example, if the neighboring cells 21, 22 use a given frequency block or multiple blocks for GSM and/or UMTS, then the network scanner 33 can at least partially determine this from the neighbor information while on the serving cell 20. In accordance with an embodiment of the disclosure, the network scanner 33 performs the scanning by avoiding the frequencies known to be used for the first RAT.

In some implementations, the network scanner 33 also avoids the frequencies known to be used for any other known RAT (e.g. UMTS) different from the second RAT. Frequencies used by the first RAT and any other known RAT different from the second RAT are avoided because they can not be used by more than one RAT in vicinity of the serving cell 20. By avoiding these frequencies, the amount of network scanning performed by the wireless device 30 can be reduced. Therefore, problems associated with excessive scanning can be avoided or mitigated.

In some implementations, if the wireless device 30 is to scan for a network using a second RAT whose frequency information is at least partially available (e.g. UMTS), then the network scanner 33 performs the scanning while avoiding the frequencies used for the first RAT and while prioritizing the frequencies known to be used for the second RAT ahead of other frequencies. By focusing on the frequencies known to be used for the second RAT, the amount of network scanning performed by the wireless device 30 can be reduced. Therefore, problems associated with excessive scanning can be avoided or mitigated.

A second example will now be described for a scenario in which the wireless device 30 scans for another network that uses the same first RAT used by the serving cell 20. The network scanner 33 determines frequencies used for the first RAT based on the neighbor information. The neighbor information is received from the serving cell 20 and indicates frequency and RAT of the neighbor cells 21, 22. Additionally, neighbor information is received from at least one of the neighbor cells 21, 22 indicating frequency and RAT of at least one neighboring cell 23 of the neighbor cell 21, 22. This can provide for more information than just the neighbor information from the serving cell 20. Alternatively, neighbor information is received only from one or more neighboring cells 21, 22 of the serving cell 20. In accordance with an embodiment of the disclosure, the network scanner 33 scans for the first RAT by prioritizing the frequencies known to be used for the first RAT ahead of other frequencies. By focusing on the frequencies known to be used for the first RAT, the amount of network scanning performed by the wireless device 30 can be reduced. Therefore, problems associated with excessive scanning can be avoided or mitigated.

In some implementations, the network scanner 33 determines frequencies used for other known RATs based on the neighbor information broadcasted from one or more neighbor cells 21, 22 and/or neighbor information broadcasted from the serving cell 20. Using this information, the network scanner 33 prioritizes frequencies not known to be used for the first RAT by avoiding the frequencies known to be used for other RATs. Frequencies known to be used by other RATs are avoided because they can not be used by more than one RAT in vicinity of the serving cell 20.

In some implementations, the network scanner 33 stores and acquires neighbour information on an ongoing basis. In other implementations, the network scanner 33 does not store neighbour information from cells previously visited. Other implementations are possible.

In the example described herein it is assumed that each RAT uses a plurality of frequencies, as multiple frequencies in a given frequency band and multiple frequency bands are typically deployed for a given RAT. However, embodiments of the disclosure are applicable to scenarios in which a RAT might use only a single frequency. UMTS might for example use only one 5-MHz-wide frequency. More generally, embodiments of the disclosure are applicable to scenarios in which each RAT uses one or more frequencies.

The examples described herein involve a mobile device "scanning" for a network. The mobile device scans frequencies to detect availability or presence of one or more networks of a certain RAT. In some implementations, detection of network by scanning a frequency involves the mobile device tuning to the frequency first. The actual selection of a frequency or frequencies to be scanned and the order in which scanning is performed is typically done in an implementation-dependent manner by the mobile device. It is to be understood that scanning for a network does not require scanning across all possible frequencies for a given RAT. Rather, more generally, scanning for a network involves scanning over one or more frequencies. The one or more frequencies might for example be a frequency block, a portion of a frequency block, or any combination of frequency blocks and portions of frequency blocks. The number of frequencies that is scanned is implementation specific and can vary depending on the situation. Some examples involve the mobile device scanning for a network while avoiding at least one frequency, and some examples involve the mobile device scanning frequencies in a certain priority order or sequence. This does not necessarily mean that the mobile device scans across all possible frequencies that are different from the at least one frequency being avoided. Again, more generally, scanning for a network involves scanning over one or more frequencies.

In the examples described herein it is assumed that the neighbor information concerns a plurality of neighboring cells, as a given cell typically has more than one neighboring cell. However, embodiments of the disclosure are applicable to scenarios in which the neighbor information concerns only one neighboring cell. More generally, embodiments of the disclosure are applicable to scenarios in which the neighbor information concerns at least one neighboring cell.

In the illustrated example, the network scanner 33 is implemented as software and is executed on the processor 32. However, more generally, the network scanner 33 may be implemented as software, hardware, firmware, or any appropriate combination thereof. Although shown as a single component, more generally, the network scanner 33 may have one or more components. The one or more components may be integrated with other components. Also, functionality of the network scanner 33 might be combined with other components. For example, in alternative implementations, the network scanner 33 and the wireless access radio 31 are combined as a single component. Other implementations are possible.

Further details of scanning for a network based on neighbour information are described below with reference to FIGS. 2 through 7.

Method of Network Scanning

Figure 2:
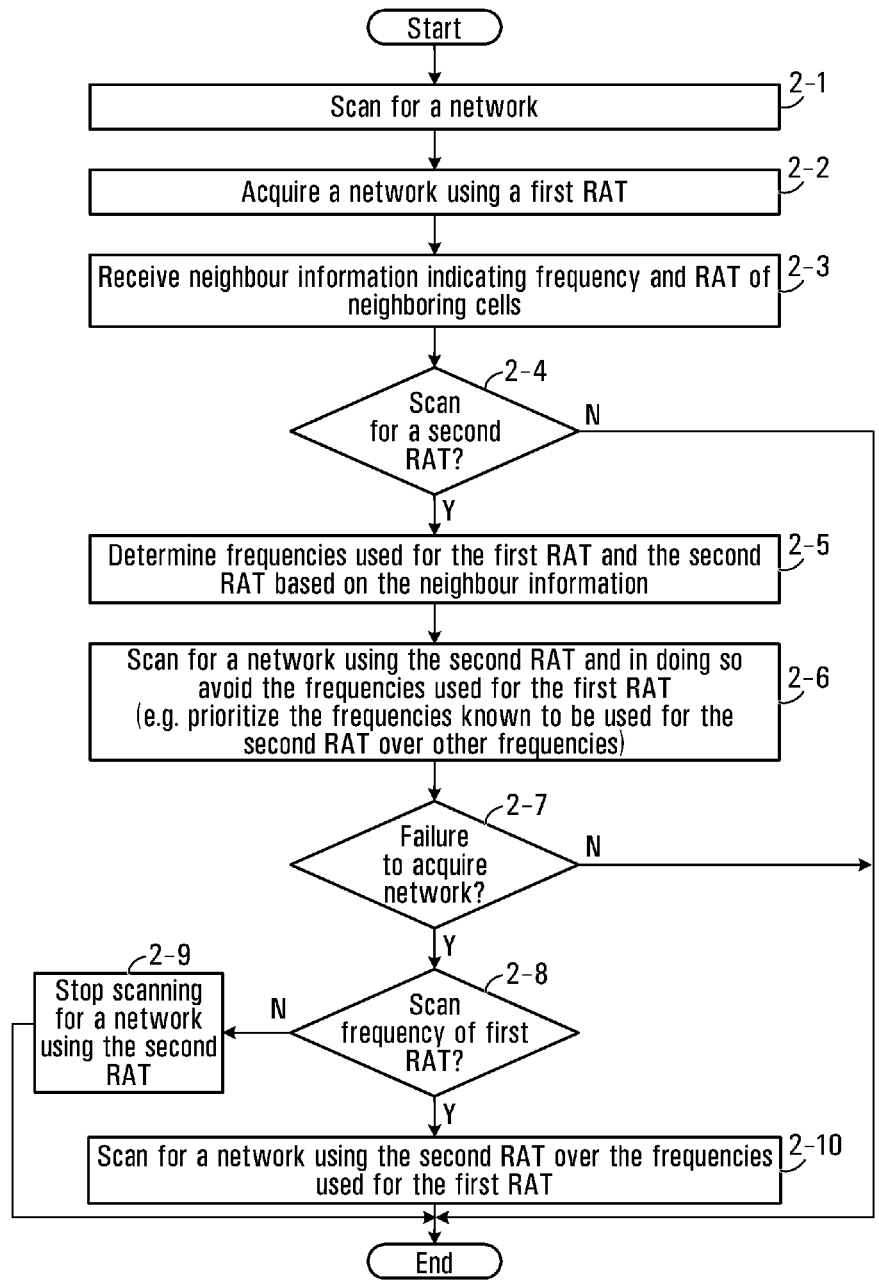
FIG. 2 is a flowchart of a method of scanning for a network based on neighbour information.

Referring now to FIG. 2, shown is a flowchart of a method of scanning for a network based on neighbour information. This method may be implemented by the network scanner 33 of the wireless device 30 shown in FIG. 1. More generally, this method may be implemented in any appropriately configured wireless device supporting a plurality of RATs.

The method begins at step 2-1 with the wireless device scanning for a network, as the wireless device is to acquire a network in order to receive service. Alternatively, if the wireless device 30 has stored identifiers of a last used network such as frequency and other RAT-specific identifiers (such as primary scrambling code in case of UMTS, short pseudo-random code in case of CDMA etc.) before the wireless device 30 was turned off, then the wireless device 30 might simply tune directly to that frequency and attempt to acquire the last camped network on that frequency upon the wireless device 30 being turned on. At step 2-2, the wireless device acquires a network using a first RAT, for example GSM. In this example, it is assumed that the wireless device is served by the network. However, as previously noted, embodiments of the disclosure are applicable to scenarios in which the wireless device does not receive any service.

At step 2-3, the wireless device receives neighbor information indicating frequency and RAT of neighboring cells. The neighbor information indicates frequencies used by the first RAT and might also indicate frequencies used by other known RATs. In some implementations, the neighbor information is received from a cell of a network that the wireless device is presently camped on or in the process of acquiring. Alternatively, or additionally, the neighbor information is received from a neighboring cell. This can provide for more information than just the neighbor information from the current cell.

Although the wireless device is served by the network, the wireless device might nonetheless try to acquire another network using a different RAT, for example CDMA. Example reasons for scanning for another network of different RATs have been provided already and are not repeated here. If at step 2-4 the wireless device is to scan for another network using a second RAT, then at step 2-5 the wireless device determines frequencies used for the first RAT based on the neighbor information. In some implementations, as indicated at step 2-5, the wireless device also determines frequencies used for the second RAT based on the neighbor information, assuming of course that the neighbor information provides this information. The wireless device might also determine frequencies used for other RATs based on the neighbor information. At step 2-6, the wireless device scans for a network using the second RAT and in doing so avoids the frequencies that are known to be used for the first RAT. In some implementations, as indicated at step 2-6, if the wireless device has determined frequencies known to be used for the second RAT, then the wireless device avoids the frequencies that are known to be used for the first RAT by prioritizing the frequencies known to be used for the second RAT over other frequencies. In some implementations, if the wireless device has determined frequencies used for other RATs that are different from the second RAT, then the wireless device avoids those frequencies too.

Frequencies used by the first RAT and any other known RATs that are different from the second RAT are avoided because they can not be used by more than one RAT in vicinity of the serving cell 20. By avoiding these frequencies, the amount of network scanning performed by the wireless device can be reduced. Therefore, problems associated with excessive scanning can be avoided or mitigated.

There are many ways to avoid the frequencies used for the first RAT or known frequencies of other RATs. As noted above, in some implementations, the wireless device prioritizes the frequencies known to be used for the second RAT over other frequencies. Other implementations are possible in which the wireless device might not determine frequencies used for the second RAT based on the neighbor information. For instance, in some implementations the wireless device attempts only frequencies that are not known from the neighbor information to be used for the first RAT. In some implementations, the wireless device avoids frequencies used for the first RAT and other RATs by avoiding a frequency block or portion thereof containing at least some of the frequencies used for the first RAT and other RATs. In other implementations, the wireless device avoids individual frequencies or frequency ranges used for the first RAT and other RATs. Other ways to avoid the frequencies used for the first RAT are possible.

In some implementations, the wireless device determines a scan order based on priority of scanning frequencies. For this scan order, the frequencies used for the first RAT and other RATs (e.g. GSM and UMTS frequencies) are assigned a low priority when scanning for a network using the second RAT (e.g. CDMA). In this manner, the wireless device tries scanning a frequency block or portion thereof used for the first RAT and other RATs only after higher priority frequencies have been scanned. In some implementations, the wireless device determines frequencies used for the second RAT based on the neighbor information. Using this information, the wireless device can scan for a network using the second RAT by prioritizing the frequencies known to be used for the second RAT over other frequencies. Other implementations are possible.

At step 2-7, the wireless device determines whether there has been failure in acquiring a network while avoiding the frequencies used for the first RAT. If there has been failure, then the wireless device either stops scanning for a network using the second RAT at step 2-9, or tries scanning a frequency block or portion thereof used for the first RAT at step 2-10. In some implementations, the wireless device is configured to always stop scanning for a network using the second RAT. In other implementations, the wireless device is configured to always try scanning a frequency block or portion thereof used for the first RAT. In other implementations, the wireless device conditionally tries scanning a frequency block or portion thereof used for the first RAT. User input is an example condition that might be considered. Other implementations are possible.

There are many ways for the wireless device to determine whether there has been failure in acquiring a network while avoiding the frequencies used for the first RAT. In some implementations, the wireless device determines that there has been failure only after all other possible frequencies have been scanned. In this manner, if the wireless device is to try scanning a frequency block or portion thereof used for the first RAT, then it will do so as a last resort only after all other possible frequencies have been scanned. In other implementations, the wireless device determines that there has been failure when select predefined frequency blocks have been scanned. Other implementations are possible.

Figure 3:
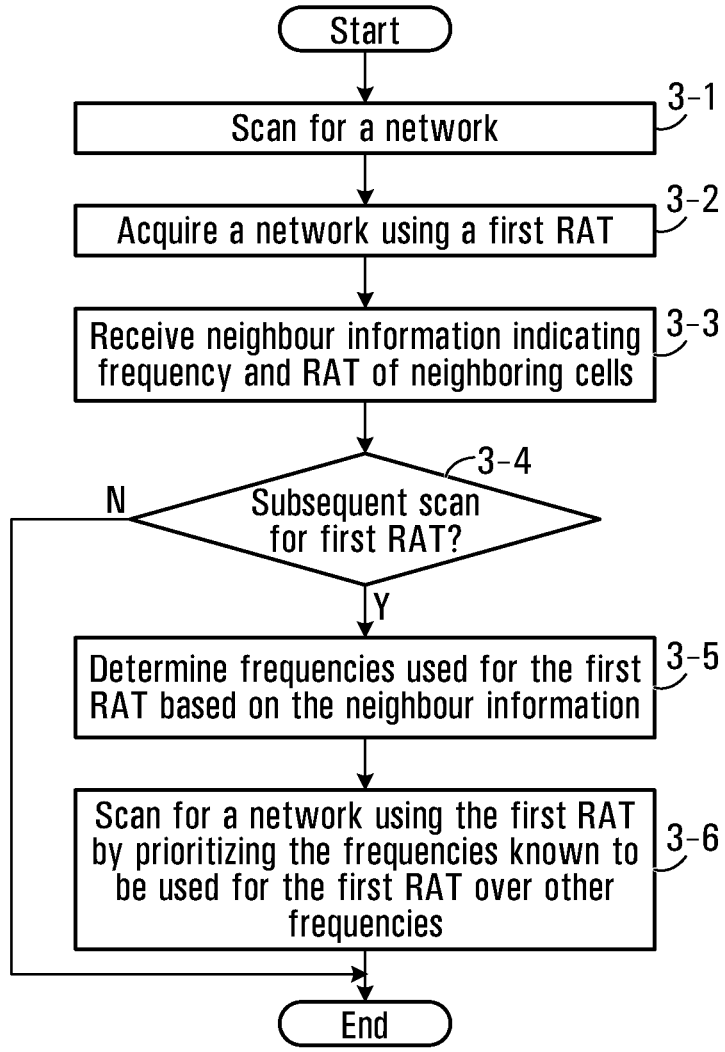
FIG. 3 is a flowchart of another method of scanning for a network based on neighbour information.

Referring now to FIG. 3, shown is a flowchart of another method of scanning for a network based on neighbour information. This method may be implemented by the network scanner 33 of the wireless device 30 shown in FIG. 1. More generally, this method may be implemented in any appropriately configured wireless device supporting a plurality of RATs.

The method begins at step 3-1 with the wireless device scanning for a network, as the wireless device is to acquire a network in order to receive service. Alternatively, if the wireless device 30 has stored identifiers of a last used network such as frequency and other RAT-specific identifiers (such as primary scrambling code in case of UMTS, short pseudo-random code in case of CDMA etc.) before the wireless device 30 was turned off, then the wireless device 30 might simply tune directly to that frequency and attempt to acquire the last camped network on that frequency upon the wireless device 30 being turned on. At step 3-2, the wireless device acquires a network using a first RAT, for example GSM. In this example, it is assumed that the wireless device is served by the network. However, as previously noted, embodiments of the disclosure are applicable to scenarios in which the wireless device does not receive any service.

At step 3-3, the wireless device receives neighbor information indicating frequencies used by the first RAT and might also indicate frequencies used by other known RATs. The neighbor information is received from the current cell indicating frequency and RAT of at least one neighboring cell of the current cell. Additionally, neighbor information is received from a neighbor cell that neighbors the current cell indicating frequency and RAT of at least one neighboring cell of the neighbor cell. This can provide for more information than just the neighbor information from the current cell. Alternatively, neighbor information is received only from one or more neighbor cells that neighbor the current cell.

Although the wireless device is served by the network, the wireless device might nonetheless try to acquire another network using the same first RAT used by the serving cell. Example reasons for scanning for another network have been provided already and are not repeated here. If at step 3-4 the wireless device is to scan for another network using the first RAT, then at step 3-5 the wireless device determines frequencies used for the first RAT based on the neighbor information. At step 3-6, the wireless device scans for a network using the first RAT by prioritizing the frequencies known to be used for the first RAT ahead of other frequencies. By focusing on the frequencies known to be used for the first RAT, the amount of network scanning performed by the wireless device 30 can be reduced. Therefore, problems associated with excessive scanning can be avoided or mitigated.

In some implementations, the wireless device determines frequencies used for other known RATs based on the neighbor information broadcasted from one or more neighbor cells and/or neighbor information broadcasted from the serving cell. Using this information, the wireless device prioritizes frequencies for the first RAT by avoiding the frequencies known to be used for other RATs. Frequencies known to be used by other RATs are avoided because they can not be used by more than one RAT in vicinity of the serving cell 20.

In the illustrated examples, it is assumed that the wireless device receives neighbour information over a broadcast channel. There are several possibilities for this, specific examples of which are provided below with reference to FIGS. 4 through 6. Other implementations for receiving the neighbor information are possible. For instance, in alternative implementations, the neighbor information is provided via a packet message over an established channel. Also, as noted above, additional neighbour information (or frequency usage by a given RAT) can also be obtained during in-call state. The additional information can supplement any neighbour information received over a broadcast channel. More generally, neighbour information can be received using any one or more appropriate communication means.

SPECIFIC EXAMPLES

Specific examples are described in this section. It is to be understood that these examples are very specific for exemplary purposes only.

According to an embodiment of the disclosure, a wireless device avoids various frequency blocks when scanning for a RAT when it is known from neighbor information that those frequency blocks are used for other RATs. As an example, in case of shared cellular/PCS bands, based on information provided by a GSM network, it can skip 1.25 MHz-wide frequency blocks that overlap with a 200-KHz-wide GSM frequency or a 5-MHz-wide UMTS frequency while doing a CDMA scan on these bands. Similarly it can skip (or at least de-prioritize) 5 MHz blocks that overlap with 200-KHz-wide GSM frequencies while doing UMTS search. This is applicable to E-GSM or 900 MHz band which can be used for UMTS as well in addition to current deployment of GSM.

Similarly it can use CDMA neighbor list received while it is on a CDMA system to decide what frequency blocks to skip while doing a GSM or UMTS scan on these bands. Further specific examples are described below with reference to FIGS. 4 through 6.

Referring now to FIGS. 4A and 4B, shown are graphs featuring an example of deployment or usage of UMTS and GSM frequencies in cellular and PCS bands as conveyed via a GSM network in cellular band as its neighbour cells. These graphs represent example neighbour information obtained by a wireless device while camped on a GSM network using an 850 MHz band. The graph of FIG. 4A shows existence of a 5-MHz-wide UMTS frequency as indicated at 4-1 in 850 MHz band. The wireless device is informed of this frequency over the broadcast channel of a GSM network on 850 MHz band via System Info 2-quarter broadcast message. The graph of FIG. 4A also shows existence of a number of 200-KHz-wide GSM frequencies as indicated at 4-2 in 850 MHz band. The wireless device is informed of these frequencies over a broadcast channel of a GSM network on the 850 MHz band via System Info 1, 2, and 2-ter broadcast messages. The graph of FIG. 4B depicts a number of 200-KHz-wide GSM frequencies as indicated at 4-3 in 1900 MHz band. The wireless device is informed of these frequencies over the broadcast channel of a GSM network on the 850 MHz band via System Info 2-ter broadcast message.

Various CDMA frequency blocks are indicated at 4-4 through 4-8 for the 850 MHz band and at 4-9 through 4-14 for the 1900 MHz band. Frequency blocks 4-4, 4-5 and 4-7 in 850 MHz contain UMTS and GSM frequencies. Therefore, these frequency blocks can not be used for other RATs such as CDMA. Approximately 5 MHz of frequency block 4-9 in 1900 MHz contains GSM frequencies. This portion of the frequency block 4-9 can not be used for other RATs such as UMTS or CDMA. Therefore, when scanning for a network using another RAT, the wireless device can avoid the frequency blocks 4-4, 4-5 and 4-7 containing UMTS and GSM frequencies along with the portion of the frequency block 4-9 containing GSM frequencies.

A first example will now be described in which the wireless device scans for a CDMA network after camping on the GSM network in 850 MHz band. For this example, it is assumed that the wireless device supports at least GSM/UMTS and CDMA. In a specific example, the wireless device supports GSM 850/1900 MHz, UMTS 2100 MHz, and CDMA 1x/1xEV-DO 850/1900 MHz. The wireless device initiates a network scan to detect a CDMA network, for example to search for a more preferred system/service, initiate a user-directed change of system mode to CDMA-only from CDMA/GSM/UMTS mode, etc. The wireless device might attempt to find a CDMA network by scanning the entire frequency range of its supported CDMA frequency bands. In accordance with an embodiment of the disclosure, while searching for a CDMA network, the wireless device avoids scanning of the frequency blocks 4-4, 4-5 and 4-7 that are known to contain UMTS and GSM frequencies as well as the portion of the frequency block 4-9 containing GSM frequencies. In this manner, the wireless device avoids scanning a substantial portion of the frequencies in the cellular bands while searching for a CDMA network based on the neighbor information received from the serving GSM network that it camped on prior to initiating the search.

A second example will now be described in which the wireless device scans for a UMTS network. For this example, it is assumed that the wireless device supports at least GSM and UMTS. In a specific example, the wireless device is configured to support GSM 850/1900 MHz and UMTS 850/1900/2100 MHz. The wireless device scans for a UMTS network, for example, as part of a search for a higher priority PLMN in automatic GSM/UMTS mode, as a result of user-initiated manual scan in GSM/UMTS mode, as a result of change of setting to UMTS-only mode etc. In accordance with an embodiment of the disclosure, while scanning for a UMTS network in 850 MHz band, the wireless device avoids the frequency blocks 4-4, 4-7 that are known to contain GSM frequencies. The wireless device also avoids the portion (5 MHz) of the frequency block 4-5 containing GSM frequencies in 850 MHz band and the portion (5 MHz) of the frequency block 4-9 containing GSM frequencies in 1900 MHz band. In this manner, the wireless device avoids scanning a substantial portion of the frequencies in the cellular bands while scanning for a UMTS network based on the neighbor information received from the current serving GSM network. In some implementations, the wireless device makes use of the information that part of frequency block 4-5 contains UMTS frequencies. For example, the wireless device can scan the frequencies known to be used for UMTS before scanning any other frequencies.

In a third example, the wireless device scans for a GSM network and in doing so avoids the portion of frequency block 4-5 used for UMTS. In some implementations, the wireless device scans the frequencies known to be used for GSM before scanning any other frequencies.

In some implementations, in addition to System Info 1, 2, 2-ter, and 2-quarter broadcast messages, the wireless device also uses Packet System Info 2, 3, 3bis, 3-quarter, 5, and 15 broadcast messages from the serving cell. Packet System Info 2, 3, 3bis, 3-quarter, 5, and 15 from the serving cell can provide additional information on frequencies used for a given RAT. This information is sent on packet-related channels and can provide additional information (or overlapping information) to supplement information received over a broadcast channel.

Figures 5A, 5B:
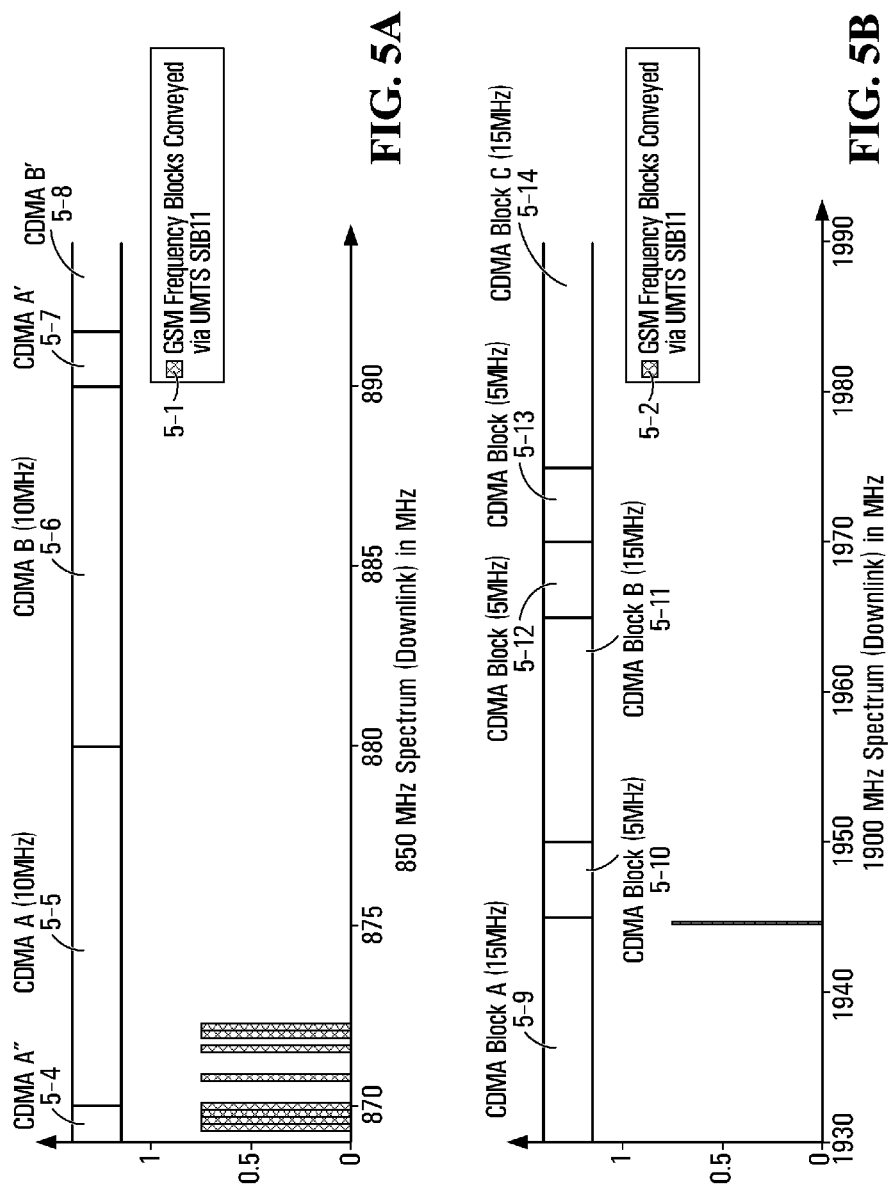
FIGS. 5A and 5B are graphs featuring an example of deployment or usage of GSM frequencies in cellular and PCS bands as conveyed via a UMTS network in cellular band as its neighbour cells.

Referring now to FIGS. 5A and 5B, shown are graphs featuring an example of deployment or usage of GSM frequencies in cellular and PCS bands as conveyed via a UMTS network in cellular band as its neighbour cells. These graphs represent example neighbour information obtained by a wireless device while camped on a UMTS network using an 850 MHz band. The graph of FIG. 5A depicts existences of a number of 200-KHz-wide GSM frequencies as indicated at 5-1 in the 850 MHz band. The wireless device is informed of these frequencies over the broadcast channel of a UMTS network on 850 MHz via SIB (system information block) 11 broadcast message. The graph of FIG. 5B depicts existence of a 200-KHz-wide GSM frequency as indicated at 5-2 in 1900 MHz band. The wireless device is informed of this frequency over the broadcast channel of a UMTS network on 850 MHz via SIB 11 broadcast message.

Various CDMA frequency blocks are indicated at 5-4 through 5-8 for the 850 MHz band and at 5-9 through 5-14 for the 1900 MHz band. Frequency block 5-4 contains GSM frequencies. Therefore, this frequency block can not be used for other RATs. A portion of frequency block 5-5 and a portion of frequency block 5-9 contain GSM frequencies. These portions should not be used for other RATs. Therefore, when scanning for a network using another RAT, the wireless device can avoid the frequency block 5-4 containing GSM frequencies along with the portions of the frequency blocks 5-5 and 5-9 containing GSM frequencies.

A first example will now be described in which the wireless device scans for a UMTS network. For this example, it is assumed that the wireless device supports at least UMTS. In a specific example, the wireless device supports GSM 850/

1900 MHz and UMTS 850/1900/2100 MHz. The wireless device scans for a UMTS network, for example to search for a higher priority PLMN in automatic GSM/UMTS mode, perform a manual scan in GSM/UMTS mode, as a result of change of setting to UMTS-only mode etc. In accordance with an embodiment of the disclosure, while searching for a UMTS network, the wireless device avoids scanning the frequency block 5-4 containing GSM frequencies along with the portions of the frequency blocks 5-5 and 5-9 containing GSM frequencies. In this manner, the wireless device avoids scanning a substantial portion of the frequencies in the cellular bands while scanning for a UMTS network based on the neighbor information received from the current serving UMTS network.

In a second example, the wireless device scans for a CDMA network and in doing so avoids the frequencies (in 1.25 MHz blocks) used for GSM. Specifically, the wireless device avoids the frequency block 5-4 containing GSM frequencies along with the portions of the frequency blocks 5-5 and 5-9 containing GSM frequencies.

Figure 6:
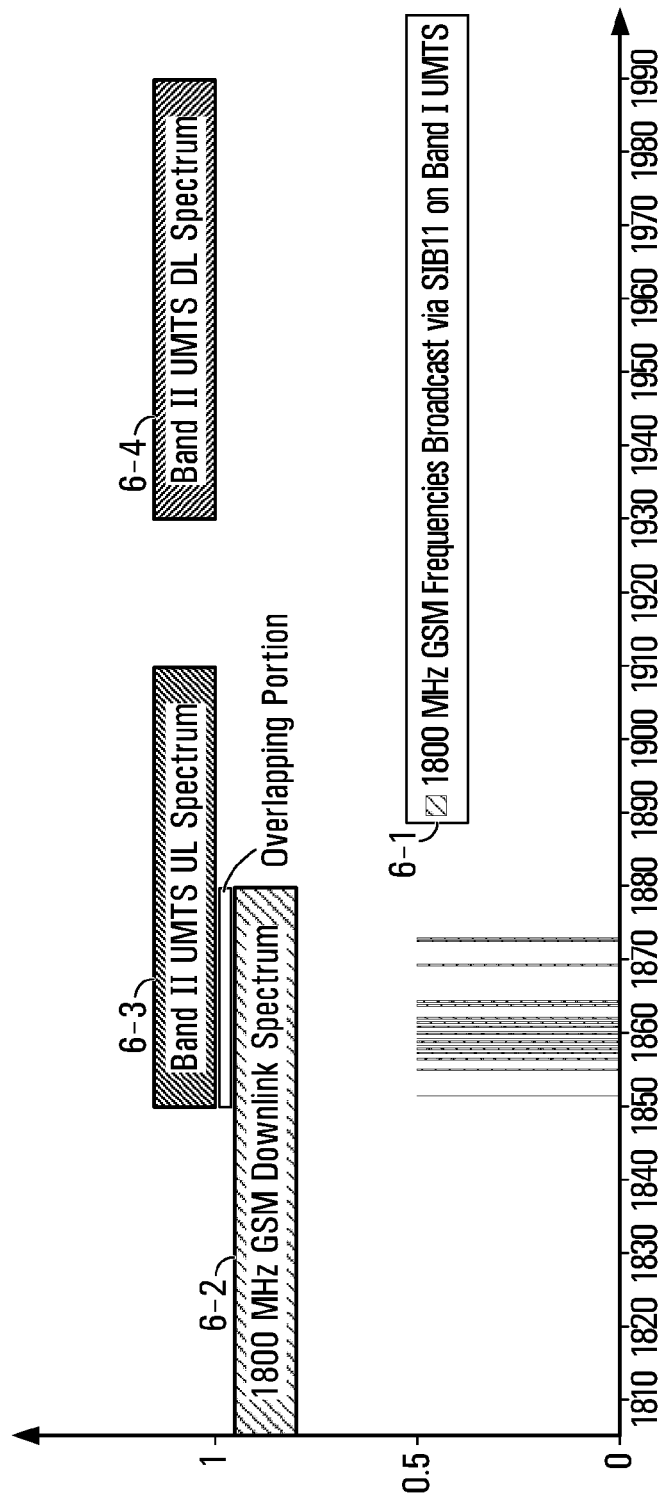
FIG. 6 is a graph featuring another example of deployment or usage of GSM frequencies in 1800 MHz band as conveyed via a UMTS network in band I as its neighbour cells which also implies absence of certain band II UMTS frequencies in an overlapping portion.

Referring now to FIG. 6, shown is a graph featuring another example of deployment or usage of GSM frequencies in 1800 MHz band as conveyed via a UMTS network in band I as its neighbour which also implies absence of certain band II UMTS frequencies in an overlapping portion. This graph represents example neighbour information obtained by a wireless device while camped on a UMTS network using band I (not shown), which has a downlink frequency spanning 2110 MHz to 2170 MHz and an uplink frequency spanning 1920 MHz to 1980 MHz. The graph shows the existences of a number of 200-KHz-wide GSM frequencies in 1800 MHz band as indicated at 6-1. The wireless device is informed of these frequencies over the broadcast channel of a UMTS network on Band I via SIB (system information block) 11 broadcast message. The 1800 MHz GSM downlink frequency as indicated at 6-2 spans over a range of 1805.1 MHz to 1879.9 MHz. The uplink frequency of band II UMTS as indicated at 6-3 ranges from 1850 MHz to 1910 MHz. Thus, there is a 30-MHz-wide overlap between the 1800 MHz GSM downlink frequency 6-2 and the uplink frequency of band II UMTS 6-3. The downlink frequency of band II UMTS as indicated at 6-4 ranges from 1930 MHz to 1990 MHz.

A portion of the uplink frequency of band II UMTS 6-3 contains GSM frequencies. Therefore, this portion can not be used for UMTS. It may be unlikely for 1800 MHz GSM 6-2 and band II UMTS 6-3 to co-exist in a given area. However, the wireless device does not know this and it may search band II UMTS in addition to 1800 MHz GSM. By using neighbour information as obtained while on 1800 MHz GSM, the wireless device while doing scanning of all supported bands (e.g. during a manual scan) can avoid searching of a certain portion of band II UMTS 6-3 if it knows that certain uplink band II blocks overlap with GSM 1800 MHz frequencies 6-2 that actually exist in that location. Specifically, the wireless device can avoid more than 20 MHz of band II spectrum 6-3 when it performs UMTS scan on band II 6-3, 6-4.

The uplink spectrum 6-3 and the downlink spectrum 6-4 are paired, meaning that each frequency used for uplink has a corresponding frequency used for downlink. Therefore, if a portion of the uplink spectrum 6-3 cannot be used for UMTS, then there is a corresponding portion of the downlink spectrum 6-4 that would not be used for UMTS. In the illustrated example, when avoiding the first ~20 MHz of uplink spectrum 6-3 during a UMTS scan, the wireless device can also avoid the first ~20 MHz of downlink spectrum 6-4.

More generally, for the frequencies determined to be used for the first RAT, the wireless device determines an overlapping portion with a first spectrum used for the second RAT. Also, for the overlapping portion of the first spectrum, the wireless device determines a corresponding portion of a second spectrum that is paired with the first spectrum for the second RAT. Therefore, when scanning for a network using the second RAT, the wireless device avoids both the overlapping portion of the first spectrum and the corresponding portion of the second spectrum.

Another Wireless Device

Figure 7:
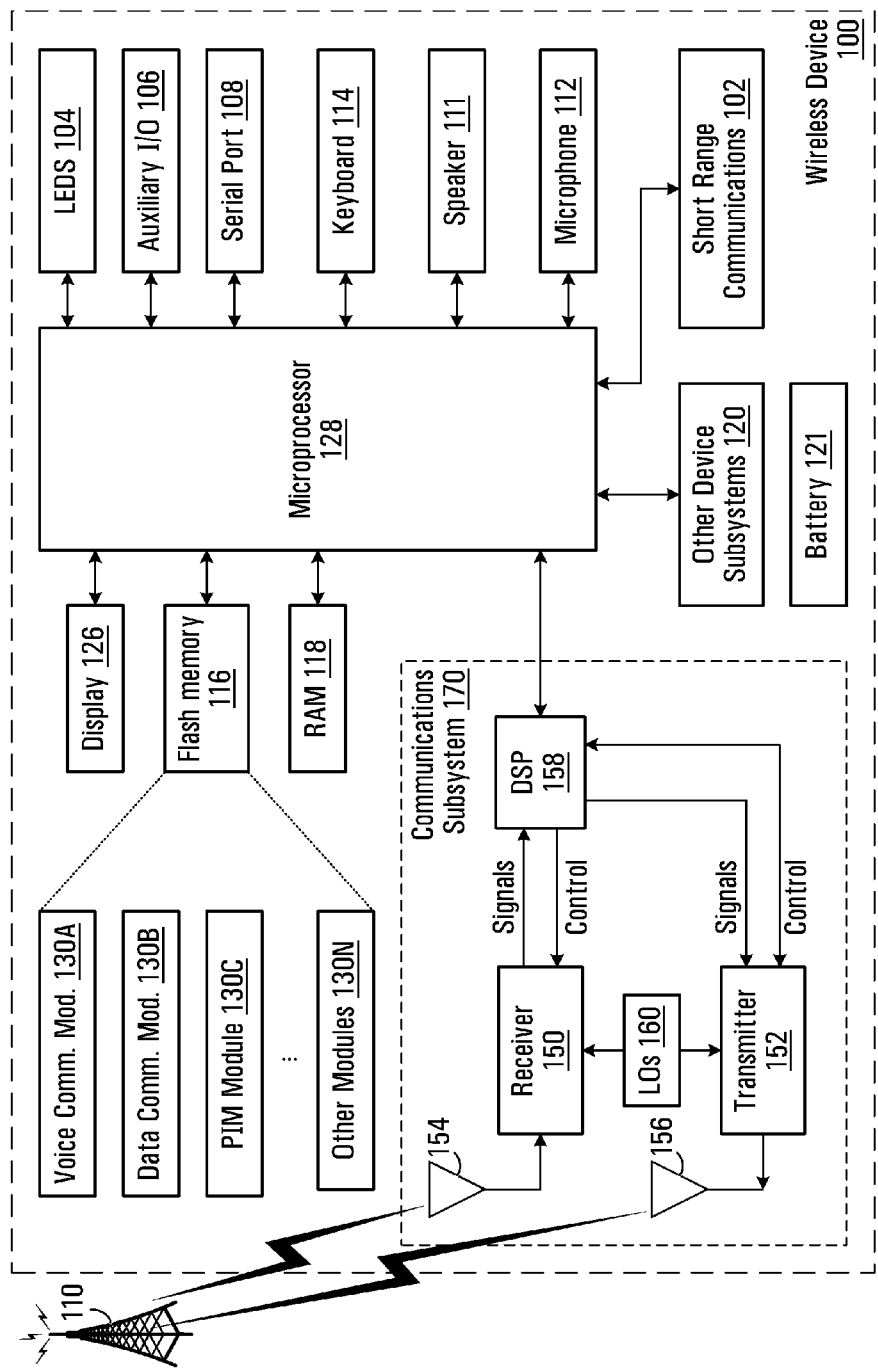
FIG. 7 is a block diagram of another wireless device.

Referring now to FIG. 7, shown is a block diagram of another wireless device 100 that may implement any of the wireless device methods described in this disclosure. The wireless device 100 is shown with specific components for implementing features similar to those of the wireless device 30 of FIG. 1. It is to be understood that the wireless device 100 is shown with very specific details for exemplary purposes only.

A processing device (a microprocessor 128) is shown schematically as coupled between a keyboard 114 and a display 126. The microprocessor 128 is a type of processor with features similar to those of the processor 32 of the wireless device 30 shown in FIG. 1. The microprocessor 128 controls operation of the display 126, as well as overall operation of the wireless device 100, in response to actuation of keys on the keyboard 114 by a user.

The wireless device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

The flash memory 116 stores computer executable instructions for implementing features similar to those of the network scanner 33 of the wireless device 30 shown in FIG. 1. In a specific implementation, the other module 130N of the flash memory 116 stores computer executable instructions that when executed implement a network scanner similar to the network scanner 33 shown in FIG. 1. Other implementations are possible.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a wireless access radio with features similar to those of the wireless access radio 31 of the wireless device 30 shown in FIG. 1. The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), UMTS/HSPA, LTE etc. Examples of CDMA include 1X and 1x EV-DO. The communication subsystem 170 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog-to-digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital-to-analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 100. In addition, the display 126 may also be utilized in voice communication mode, for example, to display the identity of a calling party, the duration of a voice call, or other voice call related information.

The short-range communications subsystem 102 enables communication between the wireless device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

In some implementations, the wireless device 100 is capable of operating in multiple modes such that it can engage in both CS (Circuit-Switched) as well as PS (Packet-Switched) communications, and can transition from one mode of communications to another mode of communications without loss of continuity. Other implementations are possible.

Numerous modifications and variations of the present disclosure are possible in light of the above teachings. It is therefore to be understood that within the scope of the appended claims, the disclosure may be practised otherwise than as specifically described herein.

We claim:

1. A method for execution by a wireless device supporting a plurality of RATs (radio access technologies), the method comprising:
    while in a current cell:
        (a) receiving, from the current cell, first neighbour information indicating frequency and RAT of at least one neighboring cell; and
        (b) receiving, from a neighbour cell that neighbours the current cell, second neighbour information indicating frequency and RAT of at least one neighboring cell of the neighbour cell;

determining at least one frequency used for a first RAT based on the first and second neighbour information; and scanning for a network using the first RAT or a second RAT based on the at least one frequency used for the first RAT.

2. The method of claim 1, wherein scanning for a network using the first RAT or the second RAT based on the at least one frequency used for the first RAT comprises:

scanning for a network using the second RAT and in doing so avoiding the at least one frequency used for the first RAT.

3. The method of claim 2, wherein avoiding the at least one frequency used for the first RAT comprises:

avoiding a frequency block or portion thereof containing at least some of the at least one frequency used for the first RAT.

4. The method of claim 2, further comprising:

determining at least one frequency used for the second RAT based on the first and second neighbour information;

wherein scanning for a network using the second RAT comprises prioritizing the at least one frequency known to be used for the second RAT over other frequencies.

5. The method of claim 2, further comprising:

upon failure to acquire a network using the second RAT while avoiding the at least one frequency used for the first RAT:

stop scanning for a network using the second RAT.

6. The method of claim 5, comprising:

determining failure to acquire a network while avoiding the at least one frequency only after all other possible frequencies are scanned.

7. The method of claim 2, further comprising:

upon failure to acquire a network using the second RAT while avoiding the at least one frequency used for the first RAT:

scanning for a network using the second RAT over the at least one frequency used for the first RAT.

8. The method of claim 2, comprising:

determining a frequency scan order based on priority of scanning frequencies such that the at least one frequency used for the first RAT is assigned a low priority;

wherein scanning for a network using the second RAT is performed based on the frequency scan order.

9. The method of claim 2, further comprising:

for the at least one frequency determined to be used for the first RAT, determining an overlapping portion with a first spectrum used for the second RAT;

for the overlapping portion of the first spectrum, determine a corresponding portion of a second spectrum that is paired with the first spectrum for the second RAT;

wherein scanning for a network using the second RAT comprises avoiding both the overlapping portion of the first spectrum and the corresponding portion of the second spectrum.

10. The method of claim 2, wherein the first neighbour information indicates at least one frequency used for GSM and at least one frequency used for UMTS, the method comprising at least one of:

scanning for a CDMA network and in doing so avoiding the at least one frequency used for GSM and the at least one frequency used for UMTS;

scanning for a GSM network and in doing so avoiding the at least one frequency used for UMTS; and scanning for a UMTS network and in doing so avoiding the at least one frequency used for GSM.

11. The method of claim 1, wherein scanning for a network using the first RAT or the second RAT based on the at least one frequency used for the first RAT comprises:

scanning for a network using the first RAT by prioritizing the at least one frequency known to be used for the first RAT over other frequencies.

12. The method of claim 11, wherein scanning for a network using the first RAT or the second RAT based on the at least one frequency used for the first RAT further comprises:

scanning for a network using the second RAT and in doing so avoiding the at least one frequency used for the first RAT.

13. The method of claim 1, wherein the first neighbour information indicates at least one frequency used for GSM, the method comprising at least one of:

scanning for a CDMA network and in doing so avoiding the at least one frequency used for GSM; and scanning for a UMTS network and in doing so avoiding the at least one frequency used for GSM.

14. A non-transitory computer readable medium having computer executable instructions stored thereon for execution on a processor of a wireless device so as to implement a method comprising:

while in a current cell:

(a) receiving, from the current cell, first neighbour information indicating frequency and RAT of at least one neighboring cell; and (b) receiving, from a neighbour cell that neighbours the current cell, second neighbour information indicating frequency and RAT of at least one neighboring cell of the neighbour cell;

determining at least one frequency used for a first RAT based on the first and second neighbour information; and scanning for a network using the first RAT or a second RAT based on the at least one frequency used for the first RAT.

15. A wireless device supporting a plurality of RATs (radio access technologies), the wireless device comprising:

a wireless access radio operable to communicate with wireless networks; and a network scanner configured for:

while in a current cell:

(a) receiving, from the current cell, first neighbour information indicating frequency and RAT of at least one neighboring cell; and (b) receiving, from a neighbour cell that neighbours the current cell, second neighbour information indicating frequency and RAT of at least one neighboring cell of the neighbour cell;

determining at least one frequency used for a first RAT based on the first and second neighbour information; and scanning for a network using the first RAT or a second RAT based on the at least one frequency used for the first RAT.

16. The wireless device of claim 15, wherein the network scanner is configured for scanning for a network using the first RAT or the second RAT based on the at least one frequency used for the first RAT by:

scanning for a network using the second RAT and in doing so avoiding the at least one frequency used for the first RAT.

17. The wireless device of claim 16, wherein the network scanner is configured for avoiding the at least one frequency used for the first RAT by:

avoiding a frequency block or portion thereof containing at least some of the at least one frequency used for the first RAT.

18. The wireless device of claim 16, wherein the network scanner is configured for:

determining at least one frequency used for the second RAT based on the first and second neighbour information;
  wherein scanning for a network using the second RAT comprises prioritizing the at least one frequency known to be used for the second RAT over other frequencies.

19. The wireless device of claim 15, wherein the network scanner is configured for scanning for a network using the first RAT or the second RAT based on the at least one frequency used for the first RAT by:
  scanning for a network using the first RAT by prioritizing the at least one frequency known to be used for the first RAT over other frequencies.

20. The wireless device of claim 19, wherein the network scanner is further configured for scanning for a network using the first RAT or the second RAT based on the at least one frequency used for the first RAT by:
  scanning for a network using the second RAT and in doing so avoiding the at least one frequency used for the first RAT.

* * * * *

UNITED STATES PATENT AND TRADEMARK OFFICE
CERTIFICATE OF CORRECTION

PATENT NO. : 8,560,008 B2
APPLICATION NO. : 13/658445
DATED : October 15, 2013
INVENTOR(S) : Muhammad Khaledul Islam et al.

It is certified that error appears in the above-identified patent and that said Letters Patent is hereby corrected as shown below:

On the title page:

Item (72) Inventors: Muhammad Khaledul Islam, Kanata, CA, please correct citizenship noted as "(US)" as it should read -- (CA) --

Jeffrey William Wirtanen, Kanata, CA, please correct citizenship noted as "(US)" as it should read -- (CA) --

Item (73) Assignee "Blackberry Limited" should read -- BlackBerry Limited --

In the Specification:

Column 4, Line 36 "assumed that wireless" should read
-- assumed that the wireless --

Column 6, Line 59 "described herein it is assumed" should read
-- described herein, it is assumed --

Signed and Sealed this
Thirty-first Day of December, 2013

Margaret A. Focarino
*Commissioner for Patents of the United States Patent and Trademark Office*